US011372134B2

(12) United States Patent
    Lentz

(10) Patent No.: US 11,372,134 B2
(45) Date of Patent: Jun. 28, 2022

(54) PEEL-AND-ADHERE PHOTONIC CRYSTAL

(71) Applicant: US Government as rep'ed by Secy of the Air Force, Wright-Patterson AFB, OH (US)

(72) Inventor: Joshua Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 385 days.

(21) Appl. No.: 16/732,395

(22) Filed: Jan. 2, 2020

(65) Prior Publication Data

US 2020/0386912 A1    Dec. 10, 2020

Related U.S. Application Data

(60) Provisional application No. 62/856,787, filed on Jun. 4, 2019.

(51) Int. Cl.
    | | |
    |---|---|
    | *G02B 1/00* | (2006.01) |
    | *G02B 5/20* | (2006.01) |
    | *G02B 5/30* | (2006.01) |
    | *H01P 1/20* | (2006.01) |
    | *G02B 5/18* | (2006.01) |
    | *H01P 1/22* | (2006.01) |
    | *G02B 5/08* | (2006.01) |

(52) U.S. Cl.
    CPC .............. *G02B 1/005* (2013.01); *G02B 5/08* (2013.01); *G02B 5/18* (2013.01); *G02B 5/205* (2013.01); *G02B 5/3083* (2013.01); *H01P 1/20* (2013.01); *H01P 1/222* (2013.01)

(58) Field of Classification Search
    CPC .......... H01P 1/20; H01P 1/222; G02B 1/005; G02B 1/002; G02B 1/00; G02B 5/08; G02B 5/18; G02B 5/205; G02B 5/3083
    USPC ........................................................ 359/741
    See application file for complete search history.

(56) References Cited

U.S. PATENT DOCUMENTS

| | | |
|---|---|---|
| 7,414,594 B2 | 8/2008 | Kim et al. |
| 7,439,938 B2 | 10/2008 | Cho et al. |
| 7,615,398 B2 | 11/2009 | McKenzie et al. |
| 7,719,744 B2 | 5/2010 | Won et al. |
| 7,768,023 B2 | 8/2010 | Diana et al. |
| 7,772,606 B2 | 8/2010 | Cao et al. |
| 7,903,239 B2 | 3/2011 | Sailor et al. |

(Continued)

FOREIGN PATENT DOCUMENTS

| | | |
|---|---|---|
| JP | 3815374 B2 | 8/2006 |
| KR | 20150019841 A | 2/2015 |

OTHER PUBLICATIONS

Anderson, P., et al., "Improving emission uniformity and linearizing band dispersion in nanowire arrays using quasi-aperiodicity," Optical Materials Express, vol. 7, No. 10, Oct. 1, 2017, pp. 3634-3642.

(Continued)

*Primary Examiner* — William R Alexander
(74) *Attorney, Agent, or Firm* — AFMCLO/JAZ; David E. Franklin

(57) ABSTRACT

A film includes a substrate having a planar surface attachable to a surface that transmits electromagnetic energy; and a photonic crystal structure formed in the planar substrate that alters the transmitted electromagnetic energy.

12 Claims, 2 Drawing Sheets

(56) References Cited

U.S. PATENT DOCUMENTS

| | | | |
|---|---|---|---|
| 8,298,032 B2 | 10/2012 | Potts et al. | |
| 8,330,900 B2 | 12/2012 | Kuo et al. | |
| 8,363,303 B2 | 1/2013 | Horning et al. | |
| 8,648,771 B2 | 2/2014 | Hwu et al. | |
| 8,907,863 B2 | 12/2014 | Li | |
| 8,947,765 B2 | 2/2015 | Han et al. | |
| 9,013,658 B2* | 4/2015 | Han | G02B 5/28 977/932 |
| 9,157,856 B2 | 10/2015 | Guo et al. | |
| 9,195,092 B2 | 11/2015 | Escuti et al. | |
| 9,395,472 B2 | 7/2016 | Kim et al. | |
| 9,398,274 B2 | 7/2016 | Jeong et al. | |
| 9,454,339 B2 | 9/2016 | Han et al. | |
| 9,638,946 B2 | 5/2017 | Lee et al. | |
| 9,726,783 B2 | 8/2017 | Perrier-Cornet et al. | |
| 9,870,194 B2 | 1/2018 | Bang | |
| 10,133,378 B2* | 11/2018 | Hsu | G06F 1/1626 |
| 10,503,007 B1* | 12/2019 | Parsons | F21V 9/00 |
| 2005/0047702 A1* | 3/2005 | Parker | G02F 1/365 385/129 |
| 2007/0019306 A1* | 1/2007 | Wu | G02B 3/0056 359/811 |
| 2008/0112669 A1* | 5/2008 | Choi | B82Y 20/00 430/5 |
| 2009/0050905 A1* | 2/2009 | Abu-Ageel | H01L 33/46 257/E33.001 |
| 2011/0108779 A1* | 5/2011 | Han | G02B 5/26 252/582 |
| 2012/0044128 A1* | 2/2012 | Joo | G02F 1/167 345/76 |
| 2013/0335807 A1* | 12/2013 | Arsenault | G02F 1/0128 264/2.7 |
| 2014/0368757 A1* | 12/2014 | Chen | G06F 3/0443 349/12 |
| 2015/0002809 A1* | 1/2015 | Cohen-Tannoudji | G02B 5/289 351/159.63 |
| 2015/0036059 A1 | 2/2015 | Momonoi et al. | |
| 2015/0070746 A1* | 3/2015 | Powers | G02F 1/0136 359/288 |
| 2016/0161822 A1 | 6/2016 | Kim et al. | |
| 2016/0259090 A1 | 9/2016 | Jiang et al. | |
| 2016/0316578 A1 | 10/2016 | Cha | |
| 2017/0123288 A1 | 5/2017 | Dmitriev et al. | |
| 2017/0159206 A1 | 6/2017 | Li et al. | |
| 2017/0163946 A1 | 6/2017 | Komanduri et al. | |
| 2018/0107312 A1* | 4/2018 | Wang | G06F 3/0412 |
| 2018/0113320 A1 | 4/2018 | Lee | |
| 2018/0122143 A1* | 5/2018 | Ellwood, Jr. | G02B 5/30 |
| 2018/0224575 A1* | 8/2018 | Marck | G02B 5/28 |
| 2019/0146133 A1* | 5/2019 | Palikaras | G02B 1/005 359/885 |
| 2019/0227317 A1* | 7/2019 | Trail | G02B 27/102 |
| 2019/0259919 A1* | 8/2019 | Piquette | H01L 33/501 |
| 2020/0186771 A1* | 6/2020 | Ellwood, Jr. | H04N 9/76 |
| 2021/0278566 A1* | 9/2021 | Guo | G02B 5/28 |

OTHER PUBLICATIONS

Liu, X., et al., "Full-spectrum light management by pseudo-disordered moth-eye structures for thin film solar cells," Optics Express, vol. 25, No. 16, Aug. 7, 2017, pp. A824-A839.

Liu, L., et al., "A strain-tunable nanoimprint lithography for linear variable photonic crystal filters," Nanotechnology, vol. 27, No. 29, Jun. 8, 2016, pp. 1-6.

Rumpf, R., et al., "Spatially variant periodic structures in electromagnetics," Phil. Trans. R. Soc. A 373, Aug. 28, 2015, pp. 1-22.

Digaum, J., et al., "Beam-bending in spatially variant photonic crystals at telecommunications wavelengths," Proc. SPIE 9759, Advanced Fabrication Technologies for Micro/Nano Optics and Photonics IX, Mar. 14, 2016, pp. 975911-1 through 975911-6.

Beaulieu, M., et al., "Large-Area Printing of Optical Gratings and 3D Photonic Crystals Using Solution-Processable Nanoparticle/Polymer Composites," ACS Photonics 2014, 1(9), Aug. 11, 2014, pp. 799-805.

Sun, T., et al., "Photonic crystal structures on nonflat surfaces fabricated by dry lift-off soft UV nanoimprint lithography," Journal of Micromechanics and Microengineering, vol. 23, No. 12, Oct. 30, 2013, pp. 1-7.

Calafiore, G., et al., "Printable photonic crystals with high refractive index for applications in visible light," Nanotechnology, vol. 27, No. 11, Feb. 15, 2016, pp. 1-7.

Pazos, J., "Digitally Manufactured Spatially Variant Photonic Crystals," Doctoral Dissertation, Department of Electrical and Computer Engineering, The University of Texas at El Paso, 2014, 102 pages.

* cited by examiner

PEEL-AND-ADHERE PHOTONIC CRYSTAL

CROSS-REFERENCE TO RELATED APPLICATIONS

This application claims the benefit of priority under 35 U.S.C. § 119(e) to U.S. Provisional Application Ser. No. 62/856,787 entitled "Peel-and-Adhere Photonic Crystal," filed 4 Jun. 2019, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of adding optical treatments to transparent surfaces.

2. Description of the Related Art

Transparent components are used to alter optic characteristics such as attenuation, polarization, etc. Improved types of optical modifying treatments of transparent components is desired.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
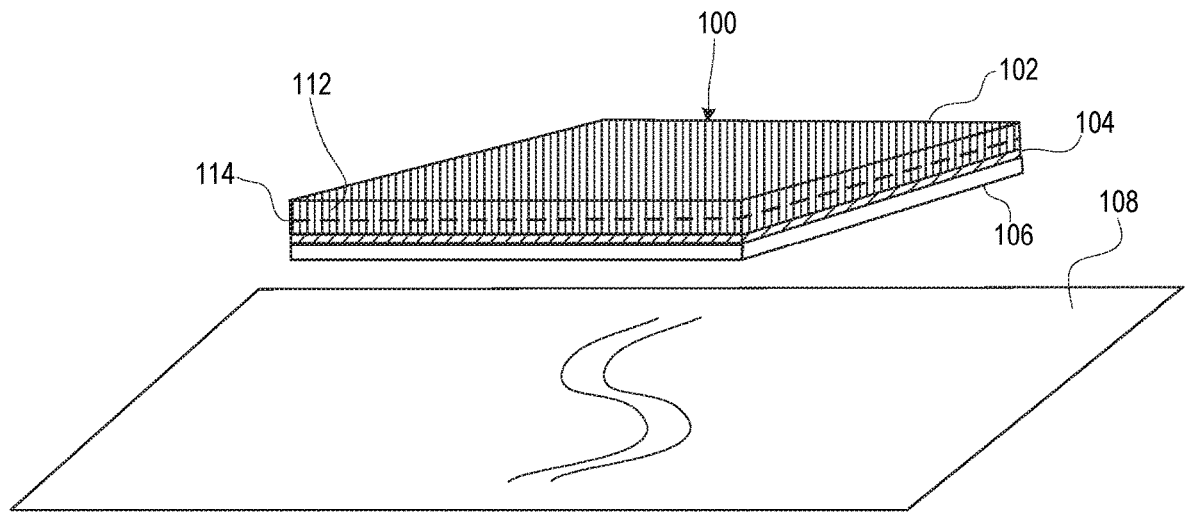
FIG. 1 illustrates an isometric view of an example flexible photonic crystal film assembly proximate to a flat transparent surface, according to one or more embodiments.
Figure 2:
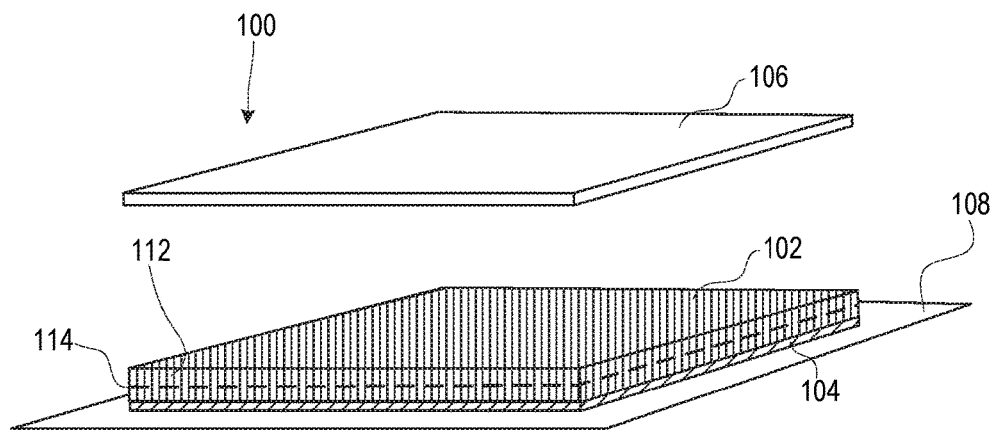
FIG. 2 illustrates an isometric view of flexible photonic film sans backing of the flexible photonic film assembly after application to the flat transparent surface, according to one or more embodiments.
Figure 3:
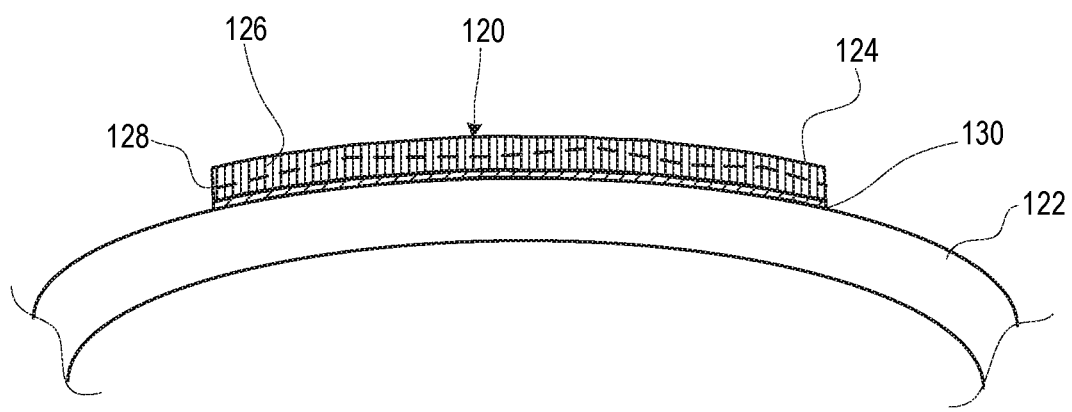
FIG. 3 illustrates a side view of the example flexible photonic film adhered to a curved transparent surface, according to one or more embodiments.

FIG. 1 depicts example flexible photonic crystal film assembly 100 with a photonic crystal layer 102, an adhesive layer 104, and a backing layer 106. A flat transparent surface 108 is cleaned in preparation. In FIG. 2, the photonic crystal layer 102 and adhesive layer 104 form a photonic crystal film 110 with the backing layer 106 removed that can be adhered to a surface, such as the flat transparent surface 108. In one or more embodiments, photonic crystal layer 110 is a rigid substrate 112 that contains and supports a photonic crystal structure 114. FIG. 3 depicts photonic crystal film 120 after application to a curved transparent surface 122. In one or more embodiments, photonic crystal layer 124 is a flexible substrate 126 that contains and supports a photonic crystal structure 128. An adhesive layer 130 can be added to the photonic crystal layer 124 immediately before applying to form photonic crystal film 120.

Photonic crystals (PCs) are complex optical structures that can be fabricated and used for a variety of optical applications including anti-reflection (AR), filtering, light deflection, reflection, absorption, dispersion, etc. Current fabrication methods create photonic crystal structures or layers deposited on a substrate (e.g. anti-reflection structure). By creating self-adhering photonic crystal layers that can be removed from a disposable backing, the PC structure could be applied to an optical component to significantly alter the inherent optical properties of the component without the need to send the component to a vendor for deposition of the desired PC structure. In this way, glass or plastic windows could be rapidly converted into high efficiency mirrors or optical filters. AR applications could rapidly be deployed onto optical elements or back surfaces of plate glass could be made absorbing with the addition of a PC layer.

The vast expanse of PC designs for different applications could be applied to the present innovation, allowing a broad range of self-adhering surface treatments. The intent is for the PCs to be flexible such that the material could be applied to planar or curved surfaces, but rigid PCs would still fall within the scope of the present innovation.

The PCs could be self-adhering through the use of adhesives, Van der Waals forces, static, surface tension, etc. Alternatively, a heated bonding process could be used. In one or more embodiments, a self-adhering photonic crystal device can consist of a photonic crystal structure with an optional applied adhesive layer, deposited on a backing material that can be removed for application of the PC structure when needed.

By adhering layers of PCs to stock windows or lenses, cost control and systems engineering flexibility can be significantly enhanced.

Photonic crystals (PCs) are naturally occurring and man-made structures that have optical performance generally quite different from bulk materials. Typically, they are composed of some combination of glass, plastic, ceramic, liquid crystals, and dielectrics in general, although metallic and semiconductor materials could be introduced. The basic structure of the PCs have a periodic or quasi-periodic lattice with the fundamental lattice constant on the order of the wavelength of light it is designed for. The intentional introduction of variations from periodic in the lattice as well as introduction of defects can enhance the optical properties if used appropriately.

PC designs have included applications for polarization control {16-18}, filtering {3} (band stop, band pass, high and low pass), enhanced reflection (this equates to a dielectric thin-film interference filter), focusing {19, 21}, patterning {23}, dispersion, anti-reflection {20}, light deflection {4-5} (in transmission), thermal management, and diffraction {22}. Wide ranges of spectral content have been explored as well as broadband designs to accommodate extended spectra {1-2, 20}.

In one or more embodiments, a photonic crystal structure resides on a backing until removed from the backing and applied to a surface as desired. The photonic crystal structure can be designed for any of the above listed applications.

The basic PC fabrication techniques include additive manufacturing (3-D printing including Fused Deposition Modeling, Fused Filament Fabrication, vat polymerization, stereolithography, Digital Light Processing, Powder Bed Fusion, Selective Laser Sintering, Material Jetting, Drop on Demand, Sand Binder Jetting, Metal Binder Jetting, Direct Metal Laser Sintering, Electron Beam Melting), subtractive manufacturing, multi-photon lithography, deposition processes, etc. The fabrication method selected must be compatible with the materials needed for the PC design of interest as well as be compatible with placement on the disposable backing material. Several fabrication methods have been demonstrated in literature {5-9, 13-15, 20}.

Free standing PC structures can be fabricated, then placed on a backing material that is held in place with surface tension. Alternatively, these PCs can be fabricated, coated with an appropriate adhesive for the application (for transmission applications, optically clear adhesive compatible with the optic material the PC will be eventually applied to is the best candidate), then placed on the backing material.

For some PCs the backing material may be used as the substrate on which the PC is built up. This includes using a backing material submerged in liquid polymer with the PC layers being built up using a vat polymerization method. This is an ideal approach as there are less processing steps of preparing a substrate and placing it on a backing material. The backing used may: (i) Be the same size as the PC structure along the dimensions of contact; (ii) Be larger than the PC structure to allow the edges to be grasped easier by hand or tweezers during the application process; and (iii) Have one or more tabs that can be grasped easily to remove the backing for the application process.

To use the invention, one could: (i) Identify the desired PC structure for the intended application, considering adhering method, substrate material and shape, intended spectrum, and other relevant optical properties; (ii) Clean the surface the PC structure will be applied to; (iii) Remove (peel) the backing from the PC structure using fingers, tweezers, forceps, etc.; (iv) Apply the PC structure to the intended substrate (window, lens, etc.) in a single smooth motion avoiding any unnecessary contact with PC structure and minimizing bubbles under the PC structure. Some PC structures may be porous, self-venting any air bubbles that may form between the substrate and PC structure. A self-adhering form of the system can be used without a backing if appropriate. This would be more useful in large applications where the PC can be stored rolled up, then unrolled directly onto the desired surface for application. In this case, a static-cling adhering is most convenient. The desired affect can be accomplished with a PC on a backing with no adhesive, but an adhesive may be applied to the substrate of interest at the time of application.

In one or more embodiments, the system may be used to transform windows into polarizers or retarders. The system may be used to transform windows into beam splitters. The system may be used to transform windows into "tinted windows". The system may be used to transform windows into neutral density filters. The system may be used to transform windows into spectral filters. The system may be used to transform windows into light deflectors (deflection in transmission). The system may be used to transform windows into mirrors. The system may be used to transform windows into lenses. The system may be used to transform windows into lenslet arrays. The system may be used to transform windows into beam shapers or other patterning elements. The system may be used to transform windows into diffraction elements such as gratings. The system may be used to reduce reflections from optical surfaces. All of the above may be added to non-planar surfaces to combine optical properties of the above list with lens or mirror surfaces. The peel-and-adhere PC system may be used with microwave or radio frequency (RF) systems. The peel-and-adhere PC system may be used in such a way that no adhering is needed and a PC element can be peeled and used freestanding (independent of a substrate).

The following references are hereby incorporated by reference in their entirety:

{1} P. Duke Anderson, Daniel D. Koleske, Michelle L. Povinelli, and Ganapathi Subramania, "Improving emission uniformity and linearizing band dispersion in nanowire arrays using quasi-aperiodicity," Opt. Mater. Express 7, 3634-3642 (2017).

{2} Liu, Xiaojun & Da, Yun & Xuan, Yimin. (2017). Full-spectrum light management by pseudo-disordered moth-eye structures for thin film solar cells. Optics Express. 25. A824.

{3} Liu, Longju & Hurayth, Abu & Li, Jingjing & Hillier, Andrew & Lu, Meng. (2016). A strain-tunable nanoimprint lithography for linear variable photonic crystal filters. Nanotechnology. 27. 295301.

{4} Rumpf, R. C., Pazos, J. J., Digaum, J. L., & Kuebler, S. M. (2015). Spatially variant periodic structures in electromagnetics. Philosophical Transactions of the Royal Society A: Mathematical, Physical and Engineering Sciences, 373(2049).

{5} Jennefir L. Digaum, Rashi Sharma, Daniel Batista, Javier J. Pazos, Raymond C. Rumpf, Stephen M. Kuebler, "Beam-bending in spatially variant photonic crystals at telecommunications wavelengths", Proc. SPIE 9759, Advanced Fabrication Technologies for Micro/Nano Optics and Photonics IX, 975911 (14 Mar. 2016).

{6} Beaulieu, Michael & Hendricks, Nicholas & Watkins, James. (2014). Large-Area Printing of Optical Gratings and 3D Photonic Crystals Using Solution-Processable Nanoparticle/Polymer Composites. ACS Photonics.

{7} Sun, Tangyou & Xu, Zhimou & Xu, Haifeng & Zhao, Wenning & Wu, Xinghui & Liu, Sisi & Ma, Zhichao & He, Jian & Liu, Shiyuan & Peng, Jing. (2013). Photonic crystal structures on nonflat surfaces fabricated by dry lift-off soft UV nanoimprint lithography. Journal of Micromechanics and Microengineering. 23.

{8} Calafiore, Giuseppe & Fillot, Quentin & Dhuey, Scott & Sassolini, Simone & Salvadori, Filippo & Prada, Camilo & Munechika, Keiko & Peroz, Christophe & Cabrini, Stefano & Piña-Hernandez, Carlos. (2016). Printable photonic crystals with high refractive index for applications in visible light. Nanotechnology. 27.

{9} Pazos, j. (2010). Digitally manufactured spatially variant photonic crystals. Phd. University of Texas at El Paso.

{10} U.S. Pat. No. 9,195,092, Escuti, et al., "polarization-independent liquid crystal display devices including multiple polarizing grating arrangements and related devices", Aug. 15, 2013;

{11} US Patent Publ. No. 20160259090, Jiang, et al., "Photonic crystal supporting high frequency sensitivity self-collimation phenomenon And design method and use thereof", Sep. 8, 2016

{12} US Patent Publ. No. 20170123288, Dmitriev, et al., "Compact optical key based on a two-dimensional photonic crystal with 120 degree Folding", May 4, 2017.

{13} U.S. Pat. No. 9,726,783, Perrier-Cornet, et al., "Methods and systems for thermal printing of photonic crystal materials, and thermally Printable photonic crystal materials and assemblies", 2017

{14} US patent No. 20160161822, Kim, et al., "Smart glass using guided self-assembled photonic crystal", Jun. 9, 2016

{15} US Patent Publ. No. 20170159206, Li, et al., "Method of making photonic crystal", Jun. 8, 2017

{16} D. R. Solli, C. F. McCormick, and R. Y. Chiao, Photonic crystal polarizers and polarizing beam splitters, Journal of Applied Physics 93, 9429 (2003)

{17} M. Thiela, M. Hermatschweiler, and M. Wegener, Thin-film polarizer based on a one-dimensional-three-dimensional-one-dimensional photonic crystal heterostructure, Appl. Phys. Lett. 91, 123515 (2007)

{18} Ravindra Kumar Sinha, Yogita Kalra, "Design of a photonic band gap polarizer," Optical Engineering 45(11), 110503 (1 Nov. 2006). https://doi.org/10.1117/1.2372461

{19} F. Gaufillet and É. Akmansoya), Design and experimental evidence of a flat graded-index photonic crystal lens, Journal of Applied Physics 114, 083105 (2013)

{20} Byron Zollars,*Steve Savoy, Qizhen Xue, Jeremy John, Kyle Hoover, Gabriel Elpers, and Roger Wood, Performance measurements of infrared windows with surface structures providing broadband, wide-angle, antireflective properties, Proc. of SPIE Vol. 8708, 87080Q 2013

{21} Lina Maigyte, Shaping of light beams with photonic crystals: spatial filtering, beam collimation and focusing, Thesis, UPC Barcelona Tech, May 2014.

{22} Daniel Maystre, "Photonic crystal diffraction gratings," Opt. Express 8, 209-216 (2001)

{23} Darius Gailevičius; Vytautas Purlys; Martynas Peckus; Roaldas Gadonas; Kestutis Staliunas; Beam shaping with numerically optimized photonic crystals, Proceedings Volume 10085, Components and Packaging for Laser Systems III; U.S. Pat. No. 1,008,510 (2017)

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A film comprising:
   a substrate having a planar surface attachable to a surface that transmits electromagnetic energy; and
   a photonic crystal structure formed in the planar substrate that polarizes the transmitted electromagnetic energy.

2. The film of claim 1, wherein the electromagnetic energy is optical energy.

3. The film of claim 1, wherein the electromagnetic energy is microwave energy.

4. The film of claim 1, wherein the electromagnetic energy is radio frequency energy.

5. The film of claim 1, further comprising:
an adhesive layer adhered to the surface of the substrate; and
a backing layer releasably engaged to the adhesive layer.

6. A film comprising:
a substrate having a planar surface attachable to a surface that transmits electromagnetic energy; and
a photonic crystal structure formed in the planar substrate that alters the transmitted electromagnetic energy, wherein the photonic crystal structure attached to the surface forms a lens.

7. A film comprising:
a substrate having a planar surface attachable to a surface that transmits electromagnetic energy; and
a photonic crystal structure formed in the planar substrate that alters the transmitted electromagnetic energy, wherein the photonic crystal structure attached to the surface forms a lenslet array.

8. A film comprising:
a substrate having a planar surface attachable to a surface that transmits electromagnetic energy; and
a photonic crystal structure formed in the planar substrate that alters the transmitted electromagnetic energy, wherein the photonic crystal structure attached to the surface forms a beam shaper of more than one optical patterning element comprises a beam shaper.

9. A film comprising:
a substrate having a planar surface attachable to a surface that transmits electromagnetic energy; and
a photonic crystal structure formed in the planar substrate that alters the transmitted electromagnetic energy, wherein the photonic crystal structure attached to the surface forms more than one diffraction element.

10. The film of claim 9, wherein the more than one diffraction element comprises a grating.

11. A film comprising:
a substrate having a planar surface attachable to a surface that transmits electromagnetic energy, wherein the substrate is flexible to conform to the surface that is nonplanar; and
a photonic crystal structure formed in the planar substrate that alters the transmitted electromagnetic energy.

12. The film of claim 11, further comprising the surface that is a selected one of: (i) a lens; and (ii) a mirror.

* * * * *